(12) United States Patent
Dunn

(10) Patent No.: US 12,429,726 B1
(45) Date of Patent: Sep. 30, 2025

(54) OPTICAL STACK WITH A LIQUID CRYSTAL LAYER AND A MICRO LENS ARRAY, ELECTRONIC DISPLAY ASSEMBLY, AND RELATED METHODS

(71) Applicant: Manufacturing Resources International, Inc., Alpharetta, GA (US)

(72) Inventor: William Dunn, Alpharetta, GA (US)

(73) Assignee: Manufacturing Resources International, Inc., Alpharetta, GA (US)

( * ) Notice: Subject to any disclaimer, the term of this patent is extended or adjusted under 35 U.S.C. 154(b) by 0 days.

(21) Appl. No.: 18/897,847

(22) Filed: Sep. 26, 2024

Related U.S. Application Data

(60) Provisional application No. 63/541,978, filed on Oct. 2, 2023.

(51) Int. Cl.
| | | |
|---|---|---|
| *F21V 8/00* | (2006.01) | |
| *G02B 27/01* | (2006.01) | |
| *G02F 1/1335* | (2006.01) | |
| *G03F 7/20* | (2006.01) | |

(52) U.S. Cl.
CPC .. *G02F 1/133526* (2013.01); *G02F 1/133531* (2021.01); *G02F 1/133607* (2021.01)

(58) Field of Classification Search
CPC ......... G02F 1/133526; G02F 1/133607; G02F 1/133531
See application file for complete search history.

(56) References Cited

U.S. PATENT DOCUMENTS

| | | |
|---|---|---|
| 1,812,919 A | 7/1931 | Balder |
| 3,510,973 A | 5/1970 | Mazzocco, Sr. |
| 4,257,084 A | 3/1981 | Reynolds |
| 4,804,953 A | 2/1989 | Castleberry |
| 5,040,878 A | 8/1991 | Eichenlaub |
| 5,046,805 A | 9/1991 | Simon |
| 5,066,106 A | 11/1991 | Sakamoto et al. |
| 5,363,149 A | 11/1994 | Furuno et al. |
| 5,365,354 A | 11/1994 | Jannson et al. |
| 5,381,309 A | 1/1995 | Borchardt |
| 5,440,324 A | 8/1995 | Strickling, III et al. |
| 5,453,855 A | 9/1995 | Nakamura et al. |
| 5,528,720 A | 6/1996 | Winston et al. |

(Continued)

FOREIGN PATENT DOCUMENTS

| | | |
|---|---|---|
| AU | 2004283319 A1 | 5/2005 |
| AU | 2007216782 A1 | 9/2007 |

(Continued)

OTHER PUBLICATIONS

Wikipedia, Gradient-index optics, 2016.

(Continued)

*Primary Examiner* — Deeprose Subedi
(74) *Attorney, Agent, or Firm* — Standley Law Group LLP; Jeffrey S. Standley; Adam J. Smith

(57) ABSTRACT

An optical stack and related electronic display assemblies and methods are disclosed. The optical stack includes a sub-stack. The sub-stack includes a micro lens array ("MLA") and a liquid crystal ("LC") layer. The MLA and the LC layer are directly or indirectly bonded to one another as part of the sub-stack.

17 Claims, 5 Drawing Sheets

(56) References Cited

U.S. PATENT DOCUMENTS

| | | |
|---|---|---|
| 5,598,068 A | 1/1997 | Shirai |
| 5,661,578 A | 8/1997 | Habing et al. |
| 5,856,854 A | 1/1999 | Hyun |
| 6,027,222 A | 2/2000 | Oki et al. |
| 6,166,389 A | 12/2000 | Shie et al. |
| 6,307,216 B1 | 10/2001 | Huh et al. |
| 6,400,101 B1 | 6/2002 | Biebl et al. |
| 6,409,356 B1 | 6/2002 | Nishimura |
| 6,419,372 B1 | 7/2002 | Shaw et al. |
| 6,421,103 B2 | 7/2002 | Yamaguchi |
| 6,437,673 B1 | 8/2002 | Nishida et al. |
| 6,446,467 B1 | 9/2002 | Lieberman et al. |
| 6,481,130 B1 | 11/2002 | Wu |
| 6,556,258 B1 | 4/2003 | Yoshida et al. |
| 6,601,984 B2 | 8/2003 | Yamamoto et al. |
| 6,636,003 B2 | 10/2003 | Rahm et al. |
| 6,683,639 B2 | 1/2004 | Driessen-Olde Scheper et al. |
| 6,762,815 B2 | 7/2004 | Lee |
| 6,789,921 B1 | 9/2004 | Deloy et al. |
| 6,805,468 B2 | 10/2004 | Itoh et al. |
| 6,842,204 B1 | 1/2005 | Johnson |
| 6,860,628 B2 | 3/2005 | Robertson et al. |
| 6,936,968 B2 | 8/2005 | Cross et al. |
| 6,949,772 B2 | 9/2005 | Shimizu et al. |
| 6,958,743 B2 | 10/2005 | Shin et al. |
| 6,982,686 B2 | 1/2006 | Miyachi et al. |
| 7,012,379 B1 | 3/2006 | Chambers et al. |
| 7,015,650 B2 | 3/2006 | McGrath |
| 7,018,054 B2 | 3/2006 | Miyashita et al. |
| 7,025,474 B2 | 4/2006 | Campbell et al. |
| 7,038,186 B2 | 5/2006 | De Brabander et al. |
| 7,040,794 B2 | 5/2006 | Bernard |
| 7,045,828 B2 | 5/2006 | Shimizu et al. |
| 7,049,761 B2 | 5/2006 | Timmermans et al. |
| 7,052,152 B2 | 5/2006 | Harbers |
| 7,053,557 B2 | 5/2006 | Cross et al. |
| 7,057,590 B2 | 6/2006 | Lim et al. |
| 7,178,963 B2 | 2/2007 | Ueda et al. |
| 7,190,416 B2 | 3/2007 | Paukshto et al. |
| 7,194,158 B2 | 3/2007 | Schultheis et al. |
| 7,210,839 B2 | 5/2007 | Jung et al. |
| 7,218,812 B2 | 5/2007 | Maxwell et al. |
| 7,232,250 B2 | 6/2007 | Chuang |
| 7,233,113 B2 | 6/2007 | Ongaro et al. |
| 7,250,637 B2 | 7/2007 | Shimizu et al. |
| 7,259,403 B2 | 8/2007 | Shimizu et al. |
| 7,307,391 B2 | 12/2007 | Shan |
| 7,307,614 B2 | 12/2007 | Vinn |
| 7,324,080 B1 | 1/2008 | Hu et al. |
| 7,327,416 B2 | 2/2008 | Lee et al. |
| 7,347,706 B1 | 3/2008 | Wu et al. |
| 7,352,940 B2 | 4/2008 | Charters et al. |
| 7,375,381 B2 | 5/2008 | Shimizu et al. |
| 7,421,167 B2 | 9/2008 | Charters et al. |
| 7,427,140 B1 | 9/2008 | Ma |
| 7,473,019 B2 | 1/2009 | Laski |
| 7,481,553 B2 | 1/2009 | Kim et al. |
| 7,481,566 B2 | 1/2009 | Han |
| 7,510,299 B2 | 3/2009 | Timmermans et al. |
| 7,513,637 B2 | 4/2009 | Kelly et al. |
| 7,542,108 B2 | 6/2009 | Saito et al. |
| 7,546,009 B2 | 6/2009 | Kukulj et al. |
| 7,682,047 B2 | 3/2010 | Hsu et al. |
| 7,738,746 B2 | 6/2010 | Charters et al. |
| 7,781,979 B2 | 8/2010 | Lys |
| 7,795,574 B2 | 9/2010 | Kennedy et al. |
| 7,813,694 B2 | 10/2010 | Fishman et al. |
| 7,853,288 B2 | 12/2010 | Ma |
| 7,883,253 B2 | 2/2011 | Wang |
| 7,982,706 B2 | 7/2011 | Ichikawa et al. |
| 8,021,900 B2 | 9/2011 | Maxwell et al. |
| 8,064,744 B2 | 11/2011 | Atkins et al. |
| 8,120,595 B2 | 2/2012 | Kukulj et al. |
| 8,125,163 B2 | 2/2012 | Dunn et al. |
| 8,194,031 B2 | 6/2012 | Yao et al. |
| 8,233,115 B2 | 7/2012 | Hadlich et al. |
| 8,274,626 B2 | 9/2012 | Choi et al. |
| 8,294,168 B2 | 10/2012 | Park et al. |
| 8,351,013 B2 | 1/2013 | Dunn et al. |
| 8,400,430 B2 | 3/2013 | Dunn et al. |
| 8,506,112 B1 | 8/2013 | Dau et al. |
| 8,508,155 B2 | 8/2013 | Schuch |
| 8,529,993 B2 | 9/2013 | Charters et al. |
| 8,585,255 B2 | 11/2013 | Wang |
| 8,648,993 B2 | 2/2014 | Dunn et al. |
| 8,674,390 B2 | 3/2014 | Harris et al. |
| 8,674,963 B2 | 3/2014 | Cornish et al. |
| 8,803,790 B2 | 8/2014 | Wasinger et al. |
| 8,829,815 B2 | 9/2014 | Dunn et al. |
| 8,842,366 B2 | 9/2014 | Arnett et al. |
| 9,030,129 B2 | 5/2015 | Dunn et al. |
| 9,081,125 B2 | 7/2015 | Dau et al. |
| 9,141,329 B1 | 9/2015 | Reicher et al. |
| 9,167,655 B2 | 10/2015 | Dunn et al. |
| 9,348,174 B2 | 5/2016 | Dunn et al. |
| 9,812,047 B2 | 11/2017 | Schuch et al. |
| 9,867,253 B2 | 1/2018 | Dunn et al. |
| 9,924,583 B2 | 3/2018 | Schuch et al. |
| 10,126,579 B2 | 11/2018 | Dunn et al. |
| 10,191,212 B2 | 1/2019 | Dunn |
| 10,261,362 B2 | 4/2019 | Brown et al. |
| 10,274,769 B2 | 4/2019 | Kil et al. |
| 10,290,786 B2 | 5/2019 | Hong et al. |
| 10,338,423 B2 | 7/2019 | Baek et al. |
| 10,431,166 B2 | 10/2019 | Wasinger et al. |
| 10,466,539 B2 | 11/2019 | Dunn et al. |
| 10,527,276 B2 | 1/2020 | Dunn et al. |
| 10,649,273 B2 | 5/2020 | Diaz et al. |
| 10,768,483 B2 | 9/2020 | Brown et al. |
| 10,831,050 B2 | 11/2020 | Dunn et al. |
| 10,921,510 B2 | 2/2021 | Dunn |
| 11,275,269 B2 | 3/2022 | Brown et al. |
| 11,474,393 B2 | 10/2022 | Diaz et al. |
| 11,644,610 B1 * | 5/2023 | Xu .................. G02F 1/133528 349/65 |
| 11,656,498 B2 | 5/2023 | Brown et al. |
| 2001/0009508 A1 | 7/2001 | Umemoto et al. |
| 2001/0033726 A1 | 10/2001 | Shie et al. |
| 2002/0043012 A1 | 4/2002 | Shibata et al. |
| 2002/0126078 A1 | 9/2002 | Horibe et al. |
| 2003/0026085 A1 | 2/2003 | Ueda et al. |
| 2003/0043312 A1 | 3/2003 | Nishida et al. |
| 2003/0227428 A1 | 12/2003 | Nose |
| 2004/0062029 A1 | 4/2004 | Ato |
| 2004/0113044 A1 | 6/2004 | Ishiguchi |
| 2005/0094391 A1 | 5/2005 | Campbell et al. |
| 2005/0105303 A1 | 5/2005 | Emde |
| 2005/0117323 A1 | 6/2005 | King |
| 2005/0140848 A1 | 6/2005 | Yoo et al. |
| 2005/0162737 A1 | 7/2005 | Whitehead et al. |
| 2005/0265019 A1 | 12/2005 | Sommers et al. |
| 2006/0012985 A1 | 1/2006 | Archie, Jr. et al. |
| 2006/0055012 A1 | 3/2006 | Hsin Chen et al. |
| 2006/0072299 A1 | 4/2006 | Lai |
| 2006/0077686 A1 | 4/2006 | Han et al. |
| 2006/0082700 A1 | 4/2006 | Gehlsen et al. |
| 2006/0087521 A1 | 4/2006 | Chu et al. |
| 2006/0092346 A1 | 5/2006 | Moon et al. |
| 2006/0092348 A1 | 5/2006 | Park |
| 2006/0092618 A1 | 5/2006 | Tanaka et al. |
| 2006/0125418 A1 | 6/2006 | Bourgault |
| 2006/0197474 A1 | 9/2006 | Olsen |
| 2006/0221612 A1 | 10/2006 | Song et al. |
| 2006/0238367 A1 | 10/2006 | Tsuchiya |
| 2006/0262079 A1 | 11/2006 | Seong et al. |
| 2006/0279946 A1 | 12/2006 | Park et al. |
| 2006/0289201 A1 | 12/2006 | Kim et al. |
| 2007/0001997 A1 | 1/2007 | Kim et al. |
| 2007/0013647 A1 | 1/2007 | Lee et al. |
| 2007/0013828 A1 | 1/2007 | Cho et al. |
| 2007/0021217 A1 | 1/2007 | Wu |
| 2007/0070615 A1 | 3/2007 | Joslin et al. |
| 2007/0097321 A1 | 5/2007 | Whitehead et al. |
| 2007/0115686 A1 | 5/2007 | Tyberghien |

(56) References Cited

U.S. PATENT DOCUMENTS

| | | |
|---|---|---|
| 2007/0127144 A1 | 6/2007 | Gao |
| 2007/0139574 A1 | 6/2007 | Ko et al. |
| 2007/0139929 A1 | 6/2007 | Yoo et al. |
| 2007/0147037 A1 | 6/2007 | Wang |
| 2007/0153515 A1 | 7/2007 | Hong et al. |
| 2007/0171353 A1 | 7/2007 | Hong |
| 2007/0171623 A1 | 7/2007 | Zagar et al. |
| 2007/0171676 A1 | 7/2007 | Chang |
| 2007/0177071 A1 | 8/2007 | Egi et al. |
| 2007/0195535 A1 | 8/2007 | Artwohl et al. |
| 2007/0198638 A1 | 8/2007 | Omura et al. |
| 2007/0206158 A1 | 9/2007 | Kinoshita et al. |
| 2007/0222910 A1 | 9/2007 | Hu |
| 2007/0230218 A1 | 10/2007 | Jachim et al. |
| 2007/0268234 A1 | 11/2007 | Wakabayashi et al. |
| 2007/0297163 A1 | 12/2007 | Kim et al. |
| 2007/0297172 A1 | 12/2007 | Furukawa et al. |
| 2008/0019147 A1 | 1/2008 | Erchak et al. |
| 2008/0036940 A1 | 2/2008 | Song et al. |
| 2008/0043463 A1 | 2/2008 | Park et al. |
| 2008/0049164 A1 | 2/2008 | Jeon et al. |
| 2008/0068836 A1 | 3/2008 | Hatanaka et al. |
| 2008/0089064 A1 | 4/2008 | Wang |
| 2008/0101086 A1 | 5/2008 | Lee |
| 2008/0106527 A1 | 5/2008 | Cornish et al. |
| 2008/0111949 A1 | 5/2008 | Shibata et al. |
| 2008/0143916 A1 | 6/2008 | Fujino et al. |
| 2008/0151527 A1 | 6/2008 | Ueno et al. |
| 2008/0158468 A1 | 7/2008 | Kim et al. |
| 2008/0165526 A1 | 7/2008 | Saraiji et al. |
| 2008/0170178 A1 | 7/2008 | Kubota et al. |
| 2008/0170400 A1 | 7/2008 | Maruyama |
| 2008/0192503 A1 | 8/2008 | Laney et al. |
| 2008/0212305 A1 | 9/2008 | Kawana et al. |
| 2008/0231196 A1 | 9/2008 | Weng et al. |
| 2008/0276507 A1 | 11/2008 | Hines |
| 2008/0284942 A1 | 11/2008 | Mahama et al. |
| 2008/0291686 A1 | 11/2008 | Cull et al. |
| 2009/0002990 A1 | 1/2009 | Becker et al. |
| 2009/0009102 A1 | 1/2009 | Kahlman et al. |
| 2009/0015755 A1 | 1/2009 | Bang et al. |
| 2009/0021461 A1 | 1/2009 | Hu et al. |
| 2009/0033612 A1 | 2/2009 | Roberts et al. |
| 2009/0058795 A1 | 3/2009 | Yamazaki |
| 2009/0061945 A1 | 3/2009 | Ma |
| 2009/0085859 A1 | 4/2009 | Song |
| 2009/0091634 A1 | 4/2009 | Kennedy et al. |
| 2009/0109165 A1 | 4/2009 | Park et al. |
| 2009/0135167 A1 | 5/2009 | Sakai et al. |
| 2009/0135583 A1 | 5/2009 | Hillman et al. |
| 2009/0174840 A1 | 7/2009 | Lee et al. |
| 2009/0196069 A1 | 8/2009 | Iwasaki |
| 2009/0201441 A1 | 8/2009 | Laney et al. |
| 2009/0213579 A1 | 8/2009 | Saraiji et al. |
| 2009/0243501 A1 | 10/2009 | Dunn et al. |
| 2009/0244884 A1 | 10/2009 | Trulaske, Sr. |
| 2009/0284457 A1 | 11/2009 | Botzas et al. |
| 2009/0289580 A1 | 11/2009 | Dunn et al. |
| 2010/0039440 A1 | 2/2010 | Tanaka et al. |
| 2010/0102735 A1 | 4/2010 | Chang et al. |
| 2010/0109553 A1 | 5/2010 | Chang et al. |
| 2010/0165240 A1 | 7/2010 | Cho et al. |
| 2010/0194296 A1 | 8/2010 | Park |
| 2010/0220258 A1 | 9/2010 | Dunn et al. |
| 2010/0231563 A1 | 9/2010 | Dunn et al. |
| 2010/0307800 A1 | 12/2010 | Wee et al. |
| 2010/0313592 A1 | 12/2010 | Pae |
| 2011/0007228 A1 | 1/2011 | Yoon et al. |
| 2011/0013114 A1 | 1/2011 | Dunn et al. |
| 2011/0083460 A1 | 4/2011 | Thomas et al. |
| 2011/0102704 A1 | 5/2011 | Dunn et al. |
| 2011/0116000 A1 | 5/2011 | Dunn et al. |
| 2011/0141724 A1 | 6/2011 | Erion |
| 2011/0164434 A1 | 7/2011 | Derichs |
| 2011/0205145 A1 | 8/2011 | Lin et al. |
| 2011/0242437 A1 | 10/2011 | Yoo et al. |
| 2011/0242839 A1 | 10/2011 | Dunn et al. |
| 2011/0283199 A1 | 11/2011 | Schuch et al. |
| 2012/0050958 A1 | 3/2012 | Sanford et al. |
| 2012/0062819 A1 | 3/2012 | Dunn et al. |
| 2012/0086344 A1 | 4/2012 | Schuch |
| 2012/0098794 A1 | 4/2012 | Kleinert et al. |
| 2012/0105424 A1 | 5/2012 | Lee et al. |
| 2012/0134139 A1 | 5/2012 | Jang et al. |
| 2012/0154712 A1 | 6/2012 | Yu et al. |
| 2012/0212520 A1 | 8/2012 | Matsui et al. |
| 2012/0212956 A1 | 8/2012 | Chen |
| 2012/0242926 A1 | 9/2012 | Hsu et al. |
| 2012/0250329 A1 | 10/2012 | Suehiro et al. |
| 2012/0268951 A1 | 10/2012 | Li |
| 2012/0274882 A1 | 11/2012 | Jung |
| 2012/0299891 A1 | 11/2012 | Fujiwara et al. |
| 2012/0314447 A1 | 12/2012 | Huang |
| 2012/0327039 A1 | 12/2012 | Kukulj |
| 2013/0016080 A1 | 1/2013 | Dunn et al. |
| 2013/0016296 A1 | 1/2013 | Fujita et al. |
| 2013/0027633 A1 | 1/2013 | Park et al. |
| 2013/0063326 A1 | 3/2013 | Riegel |
| 2013/0094160 A1 | 4/2013 | Narumi |
| 2013/0163277 A1 | 6/2013 | Kim et al. |
| 2013/0258659 A1 | 10/2013 | Erion |
| 2013/0278868 A1 | 10/2013 | Dunn et al. |
| 2013/0279154 A1 | 10/2013 | Dunn |
| 2014/0016355 A1 | 1/2014 | Ajichi |
| 2014/0078407 A1 | 3/2014 | Green et al. |
| 2014/0085564 A1 | 3/2014 | Hendren et al. |
| 2014/0104538 A1 | 4/2014 | Park et al. |
| 2014/0134767 A1 | 5/2014 | Ishida et al. |
| 2014/0144083 A1 | 5/2014 | Artwohl et al. |
| 2014/0160365 A1 | 6/2014 | Kwong et al. |
| 2014/0268657 A1 | 9/2014 | Dunn et al. |
| 2014/0285477 A1 | 9/2014 | Cho et al. |
| 2014/0340375 A1 | 11/2014 | Dunn et al. |
| 2014/0361969 A1 | 12/2014 | Wasinger et al. |
| 2015/0009653 A1 | 1/2015 | Dunn et al. |
| 2015/0153506 A1 | 6/2015 | Dunn |
| 2015/0205166 A1 | 7/2015 | Kageyama |
| 2015/0219954 A1 | 8/2015 | Kubo |
| 2015/0226996 A1 | 8/2015 | Ohashi |
| 2015/0245443 A1 | 8/2015 | Dunn et al. |
| 2015/0247968 A1 | 9/2015 | Verrat-Debailleul et al. |
| 2015/0346525 A1 | 12/2015 | Wolf et al. |
| 2015/0362768 A1 | 12/2015 | Dunn |
| 2016/0037606 A1 | 2/2016 | Dunn et al. |
| 2016/0103275 A1 | 4/2016 | Diaz et al. |
| 2016/0238876 A1 | 8/2016 | Dunn et al. |
| 2016/0300549 A1 | 10/2016 | Zhang |
| 2016/0334666 A1 | 11/2016 | Liu |
| 2016/0335705 A1 | 11/2016 | Williams et al. |
| 2016/0338181 A1 | 11/2016 | Schuch et al. |
| 2016/0338182 A1 | 11/2016 | Schuch et al. |
| 2016/0351133 A1 | 12/2016 | Kim et al. |
| 2016/0358538 A1 | 12/2016 | Schuch et al. |
| 2017/0059938 A1 | 3/2017 | Brown et al. |
| 2017/0248823 A1 | 8/2017 | Dunn et al. |
| 2018/0012566 A1 | 1/2018 | Lin et al. |
| 2018/0048849 A1 | 2/2018 | Dunn |
| 2018/0061297 A1 | 3/2018 | Schuch et al. |
| 2019/0079335 A1 | 3/2019 | Dunn et al. |
| 2019/0154909 A1 | 5/2019 | Dunn |
| 2019/0155103 A1 | 5/2019 | Brown et al. |
| 2020/0233265 A1 | 7/2020 | Diaz et al. |
| 2020/0355965 A1 | 11/2020 | Brown et al. |
| 2022/0146884 A1 | 5/2022 | Brown et al. |

FOREIGN PATENT DOCUMENTS

| | | |
|---|---|---|
| CA | 2536130 A1 | 5/2005 |
| CA | 2688214 A1 | 11/2008 |
| CN | 1836179 A | 9/2006 |
| CN | 101432647 B | 5/2007 |
| CN | 101048685 A | 10/2007 |
| CN | 101339272 A | 1/2009 |
| CN | 101351765 A | 1/2009 |

(56) References Cited

FOREIGN PATENT DOCUMENTS

| | | | |
|---|---|---|---|
| CN | 101681222 | A | 3/2010 |
| EP | 0313331 | | 4/1989 |
| EP | 1678534 | A1 | 7/2006 |
| EP | 1805539 | A1 | 7/2007 |
| EP | 2156276 | A4 | 5/2008 |
| EP | 1941342 | A1 | 7/2008 |
| GB | 153110 | | 11/1920 |
| IN | 30/2007 | | 2/2006 |
| IN | 03/2009 | | 5/2008 |
| IN | 15/2010 | | 12/2009 |
| JP | 11095214 | A | 4/1999 |
| JP | 2002064842 | | 2/2002 |
| JP | 2002209230 | | 7/2002 |
| JP | 2004004581 | A | 1/2004 |
| JP | 2007509372 | B2 | 10/2004 |
| JP | 2004325629 | A | 11/2004 |
| JP | 2005228996 | A | 8/2005 |
| JP | 2005236469 | | 9/2005 |
| JP | 2005-292939 | A | 10/2005 |
| JP | 2008518251 | A | 10/2005 |
| JP | 2005-332253 | A | 12/2005 |
| JP | 2006-198344 | A | 8/2006 |
| JP | 2007080872 | A | 3/2007 |
| JP | 2009535723 | A5 | 5/2007 |
| JP | 200876755 | A | 4/2008 |
| JP | 2008112719 | A | 5/2008 |
| JP | 2008256819 | A | 10/2008 |
| JP | 2009036964 | A | 2/2009 |
| JP | 2009512898 | A | 3/2009 |
| JP | 2009231473 | A | 10/2009 |
| JP | 2010509622 | A | 3/2010 |
| JP | 2010527100 | A | 8/2010 |
| JP | 2010282109 | A | 12/2010 |
| JP | 2011081424 | A | 4/2011 |
| JP | 2014-71343 | A | 4/2014 |
| KR | 20-0286961 | Y1 | 8/2002 |
| KR | 1020070003755 | A | 2/2006 |
| KR | 20070005637 | A | 1/2007 |
| KR | 1020070084554 | A | 5/2007 |
| KR | 20080013592 | A | 2/2008 |
| KR | 20080063414 | A | 7/2008 |
| KR | 20080074972 | A | 8/2008 |
| KR | 1020090007776 | A | 1/2009 |
| KR | 20100019997 | A | 2/2010 |
| KR | 1020050033986 | A | 4/2014 |
| KR | 101796718 | A | 11/2017 |
| TW | 200615598 | A | 5/2006 |
| TW | 200802054 | A | 1/2008 |
| TW | 200808925 | A | 2/2008 |
| TW | 200809285 | A | 2/2008 |
| TW | 200809287 | A | 2/2008 |
| TW | 200828093 | A | 7/2008 |
| TW | 200912200 | A | 3/2009 |
| TW | 201030376 | A | 8/2010 |
| TW | 201038114 | A | 10/2010 |
| WO | WO9608892 | | 3/1996 |
| WO | WO2005051054 | A2 | 6/2005 |
| WO | WO2005093703 | A1 | 10/2005 |
| WO | WO2006001559 | A1 | 1/2006 |
| WO | WO2006109237 | A1 | 10/2006 |
| WO | WO2007052777 | A1 | 5/2007 |
| WO | WO2005040873 | A1 | 5/2008 |
| WO | WO2008138049 | A | 11/2008 |
| WO | WO2008152832 | A1 | 12/2008 |
| WO | WO2009004574 | A1 | 1/2009 |
| WO | WO2010080624 | | 7/2010 |
| WO | WO2010129271 | A2 | 11/2010 |
| WO | WO2011100429 | A2 | 8/2011 |
| WO | WO2011143719 | | 11/2011 |
| WO | WO2014/034546 | A1 | 3/2014 |
| WO | WO2014158642 | A1 | 10/2014 |
| WO | WO2015003130 | A1 | 1/2015 |
| WO | WO2018031753 | A1 | 2/2018 |

OTHER PUBLICATIONS

Patrick Frantz & Deania Fernandez, Printed Circuit Boards (PCBs), Feb. 18, 2004, 2 Pages, Version 1.1.
Teravision Corp., LCD-TV Panel Control Board Specification, Nov. 2007, 24 Pages.
Supertex Inc., Constant Off-time, Buck-based LED Drivers Using HV9910, Nov. 2, 2004, 4 Pages.
Grin Tech, Grin Lenses, Aug. 25, 2016, 4 Pages.
Supertex Inc., Universal High Brightness LED Driver, 2007, 8 Pages.
Shigeru Aoyama, Akihiro Funamoto & Koichi Imanaka, Hybrid normal-reverse prism coupler for light-emitting diode backlight systems, Oct. 1, 2006, 6 Pages, vol. 45, No. 28.
Panel-Brite, Inc., High Brightness LED Backlight Technology, Mar. 11, 2009, 1 Page.
RPO, How Digital Waveguide Touch Works, Sep. 15, 2011, 1 Page.
Dave Roos, How Transmissive Film Works, article, 2008, 9 pages.
Schott, Glass made of Ideas—Opalika, 2016, 2 pages.
Anandan, LED Backlight: Enhancement of picture quality on LCD screen, Oct. 8-12, 2006, 5 pages.
Lu, Color shift reduction of a multi-domain IPS-LCD using RGB-LED backlight, 2006, 10 pages.
Anandan, M., Progress of LED backlights for LCDs, Journal of the SID, 2008, pp. 287-310, 16/2.
3M, 3M™ Dual Brightness Enhancement Film, https://www.3m.com/3M/en_US/p/d/b5005047085/, 2024, 8 pages.
Youtube, Why 2023 OLED TVs Will Be the Brightest & Best Yet, https://www.youtube.com/watch?v=23PZPKIRH4w, 2023, 1 page.

* cited by examiner

OPTICAL STACK WITH A LIQUID CRYSTAL LAYER AND A MICRO LENS ARRAY, ELECTRONIC DISPLAY ASSEMBLY, AND RELATED METHODS

CROSS-REFERENCE TO RELATED APPLICATIONS

This application claims the benefit of U.S. provisional patent application Ser. No. 63/541,978 filed Oct. 2, 2023, the disclosures of which are hereby incorporated by reference as if fully restated herein.

TECHNICAL FIELD

Exemplary embodiments relate generally to an optical stack with a liquid crystal layer and a micro lens array, electronic display assemblies, and related methods.

BACKGROUND AND SUMMARY OF THE INVENTION

Micro lens arrays (MLAs) provide miniaturized lens which are sometimes used to focus light, such as may be emitted from an electronic display. The MLA may include a substrate with a large number of small lenses. The MLA may be placed atop an organic light emitting diode (OLED) type display, for example, to focus light emanating from the OLED display that may otherwise be scattered and/or turned into heat, for example.

Some electronic display assemblies utilize multiple layers which form part of, are placed in front of, and/or are positioned behind an electronic display or electronic display layer (e.g., layer of liquid crystals, sometimes referred to herein as a liquid crystal layer or "LC layer"). Together, these are sometimes referred to as an "optical stack". Examples of such components include backlights or other light sources (e.g., for the LC layer), diffusers, polarizers, adhesives (e.g., optically clear adhesives), covers (e.g., transparent or translucent layers), anti-reflective films, and the like. These layers may be provided in various combinations and/or arranged in various ways to provide certain benefits. Touch input layers or components may optionally be included in the optical stack or otherwise provided.

An optical stack with a liquid crystal layer and a micro lens array is provided, along with related electronic display assemblies and methods. In exemplary embodiments, without limitation, the optical stack includes a backlight, a diffuser forward of the backlight, a prism film forward of the diffuser, a first polarizer (e.g., reflective linear polarizer) forward of the prism film, a micro lens array (MLA) forward of the first polarizer, a second polarizer forward of the MLA, an electronic display layer (e.g., liquid crystal layer) forward of the second polarizer, and (optionally) a third polarizer forward of the electronic display layer. In exemplary embodiments, the second and third polarizers are directly bonded to the electronic display layer and/or the MLA is directly bonded to the second polarizer. Remaining layers may be spaced apart from one another.

Positioning of the MLA may cause light, which is typically somewhat scattered when exiting the prism film, to be at least somewhat focused before entering the second polarizer. This may, alternatively or additionally, capture and refocus light which is reflected by the polarizer rearward for a second attempt through the electronic display layer after being reflected forward again towards the electronic display layer. For example, a reflective surface(s) may be provided at a rear of the backlight or rearward thereof. This may result in increased image brightness and/or improved efficiency, among other advantages.

In other exemplary embodiments, without limitation, the MLA is instead positioned forward of the electronic display layer, which is a liquid crystal layer for a liquid crystal type display ("LCD"). The MLA may be bonded to the third polarizer. In this way, some portion of light which is ordinarily trapped/reflected at or within the film layers of the third polarizer, which is preferably optically bonded to a front of the LC layer, such as due to Total Internal Reflection ("TIR"), is instead emitted from the front of the LC layer due to the addition of the MLA. This may result in improved image quality, among other advantages. The MLA may be optically bonded to a front surface of the LC layer. Remaining layers may be spaced apart from one another.

Further features and advantages of the systems and methods disclosed herein, as well as the structure and operation of various aspects of the present disclosure, are described in detail below with reference to the accompanying figures.

BRIEF DESCRIPTION OF THE DRAWINGS

In addition to the features mentioned above, other aspects of the present invention will be readily apparent from the following descriptions of the drawings and exemplary embodiments, wherein like reference numerals across the several views refer to identical, similar, or equivalent features, and wherein.

DETAILED DESCRIPTION OF EXEMPLARY EMBODIMENT(S)

Various embodiments of the present invention will now be described in detail with reference to the accompanying drawings. In the following description, specific details such as detailed configuration and components are merely provided to assist the overall understanding of these embodiments of the present invention. Therefore, it should be apparent to those skilled in the art that various changes and modifications of the embodiments described herein can be made without departing from the scope and spirit of the present invention. In addition, descriptions of well-known functions and constructions are omitted for clarity and conciseness.

Embodiments of the invention are described herein with reference to illustrations of idealized embodiments (and intermediate structures) of the invention. As such, variations from the shapes of the illustrations as a result, for example, of manufacturing techniques and/or tolerances, are to be expected. Thus, embodiments of the invention should not be construed as limited to the particular shapes of regions illustrated herein but are to include deviations in shapes that result, for example, from manufacturing.

Figure 1:
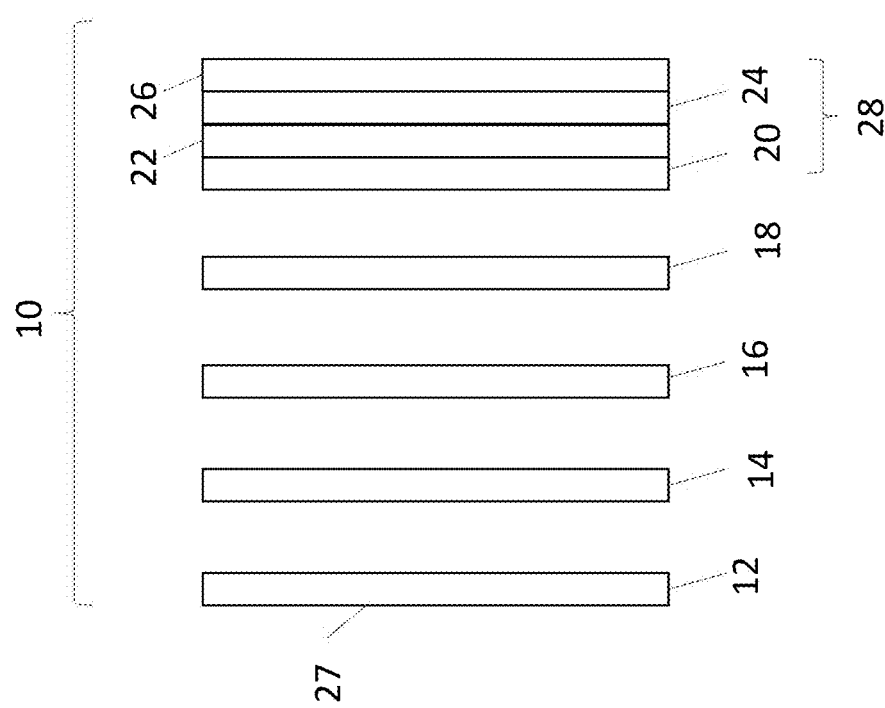
FIG. 1 is a side, sectional view of an exemplary optical stack in accordance with the present invention.

FIG. 1 illustrates an exemplary optical stack 10. In exemplary embodiments, without limitation, the optical stack 10 includes a light source 12. The light source 12 may be positioned at a rear portion of the optical stack 10. The light source 12 may comprise a backlight in exemplary embodiments, without limitation. For example, the light source 12 may comprise a number of light emitting diodes (LEDs) arranged to provide direct backlighting to a permissive type electronic display layer 24 (e.g., liquid crystal layer), by way of non-limiting example. More specifically, without limitation, the light source 12 may comprise a printed circuit board ("PCB") or other substrate, each with one or more LEDs provided thereon. A reflective surface 27, side(s), and/or other portion of the light source 12 may comprise reflective material.

Alternatively, or additionally, the light source 12 may comprise edge lighting for the electronic display layer 24. For example, the light source 12 may comprise a number of light emitting diodes (LEDs), such as arranged at one or more substrates, around one or more perimeter edges of a diffuser 14, preferably located rearward of the electronic display layer 24. In such embodiments, the reflective surface 27 may be provided at a rear surface of the diffuser 14 or at a separate layer behind the diffuser 14.

The optical stack 10 may include the diffuser 14, which may be positioned forward of the light source 12 (and/or reflective surface(s) 27).

A prism film 16 may be positioned forward of the diffuser 14.

A first polarizer 18 may be positioned forward of the prism film 16. The first polarizer 18 in exemplary embodiments, without limitation, comprises a reflective linear polarizer. The first polarizer 18 may comprise a dual brightness enhancement film ("DBEF"), such as available from 3M™ of St. Paul, Minnesota (https://www.3 m.com/3M/en_US/p/d/b5005047085/) by way of non-limiting example.

The optical stack 10 may comprise an MLA 20. The MLA 20 may be positioned forward of the first polarizer 18. The MLA may be positioned rearward of a second polarizer 22. In exemplary embodiments, without limitation, the MLA 20 is directly adjacent to a rear surface of the second polarizer 22. For example, without limitation, the MLA 20 is bonded to the rear surface of the second polarizer 22 by way of an optically clear adhesive.

The electronic display layer 24 may be positioned forward of the second polarizer 22. A rear surface of the electronic display layer 24 may be directly bonded to a forward surface of the second polarizer 22. The electronic display layer 24 may comprise a permissive type display layer, such as but not limited to a liquid crystal layer (LC layer). In this fashion, the optical stack 10 may be part of a liquid crystal type display (LCD) and/or display subassembly.

Optionally, a third polarizer 26 may be provided forward of the electronic display layer 24. For example, the third polarizer 26 may be directly bonded to a front surface of the electronic display layer 24.

The MLA 20, second polarizer 22, electronic display layer 24, and (optionally) the third polarizer 26 may form a sub-stack 28. The sub-stack 28 may comprise, or consist of, directly or indirectly bonded components.

The second and/or third polarizers 22, 26 may comprise circular polarizers, linear polarizers, quarter wave retarders, combinations thereof, or the like. The third polarizer 26 may optionally be placed rearward of the electronic display layer 24.

Figure 2:
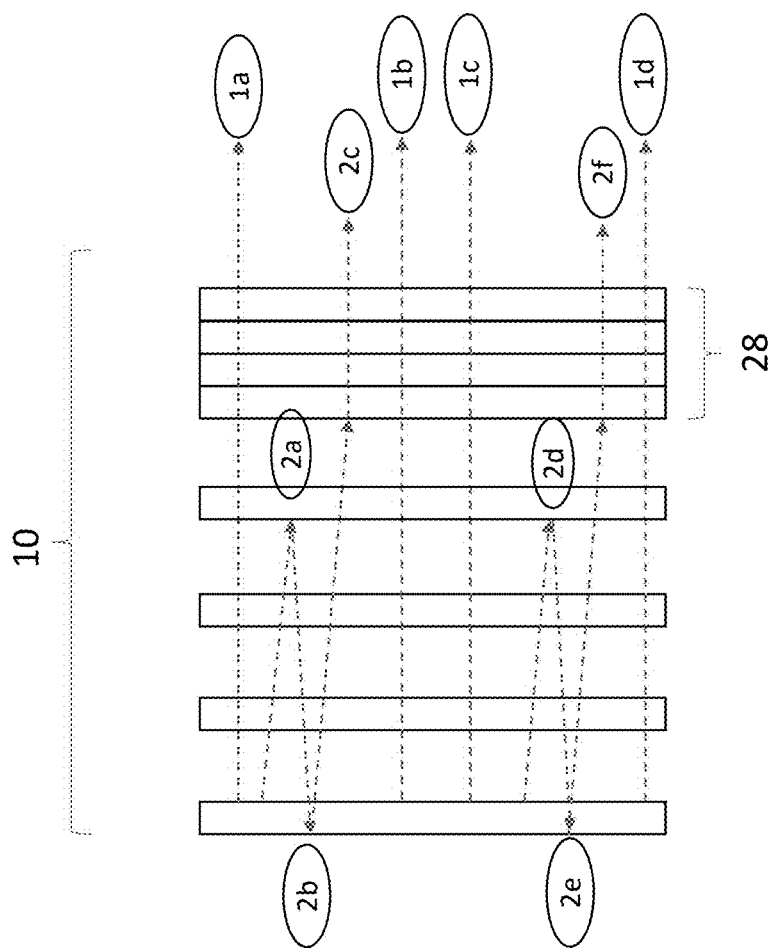
FIG. 2 illustrates exemplary light travel through the optical stack of FIG. 1.

As illustrated with particular regard to FIG. 2, light exiting the light source 12 may travel through the diffuser 14, which may relatively scatter and/or homogenize the light. The light may further travel through the prism film 16, which may collimate the light in a direction, such as but not limited to vertical or horizontal. The light may further travel through the first polarizer 18, some of which may be reflected and/or absorbed, and other portions of which may be passed through. Some of the light (e.g., illustrated rays 1a-1d) may be properly oriented for acceptance by the first polarizer 18 for travel through the electronic display layer 24. Other portions of the light (e.g., illustrated rays 2a, 2d) may not be properly oriented and be reflected or obstructed by the first polarizer 18 and may preferably travel rearward (e.g., with reflective type polarizer, illustrated rays 2b, 2e), such as through certain layers of the optical stack 10 before being reflected forward again, such as by the reflective surface(s) 27 through at least certain layers of the optical stack 10 (e.g., illustrated rays 2c, 2f). At least some of the light may further travel through the MLA 20 for relative focusing before entering the second polarizer 22 and/or sub-stack 28. At least some of the reflected portions of light may be accepted and others may be further recycled, such as until being transformed into another form (e.g., heat). In this fashion, the light may be recycled through the optical stack 10 for multiple attempts to enter the electronic display layer 24 and/or sub-stack 28. This may result in increased image brightness and/or improved efficiency, among other advantages.

Figure 3:
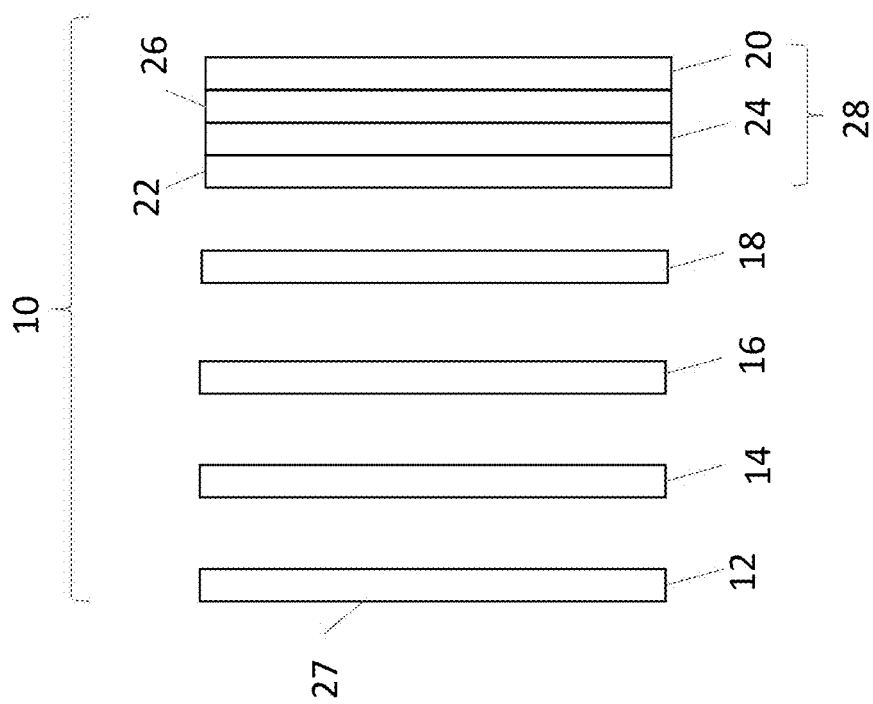
FIG. 3 is a side, sectional view of another exemplary optical stack in accordance with the present invention.

As illustrated in FIG. 3, the MLA 20 may, alternatively, or additionally, be positioned forward of the electronic display layer 22 (e.g., liquid crystal layer), such as at a forward surface of the third polarizer 26 by way of non-limiting example. In exemplary embodiments, the MLA 20 is optically bonded to the third polarizer 26. Some portion of light which is ordinarily trapped/reflected at or within the film layers of the third polarizer 26, such as due to TIR, is instead emitted from a front of the electronic display layer 24, due, at least in part, to the addition of the MLA 20.

The second polarizer 22, electronic display layer 24, MLA 20, and the third polarizer 26 may form a sub-stack 28.

In other exemplary embodiments, without limitation, the MLA 20 is positioned at the front of the electronic display layer 24, such as by optical bonding, such as where a third polarizer 26 is not used.

Figure 4:
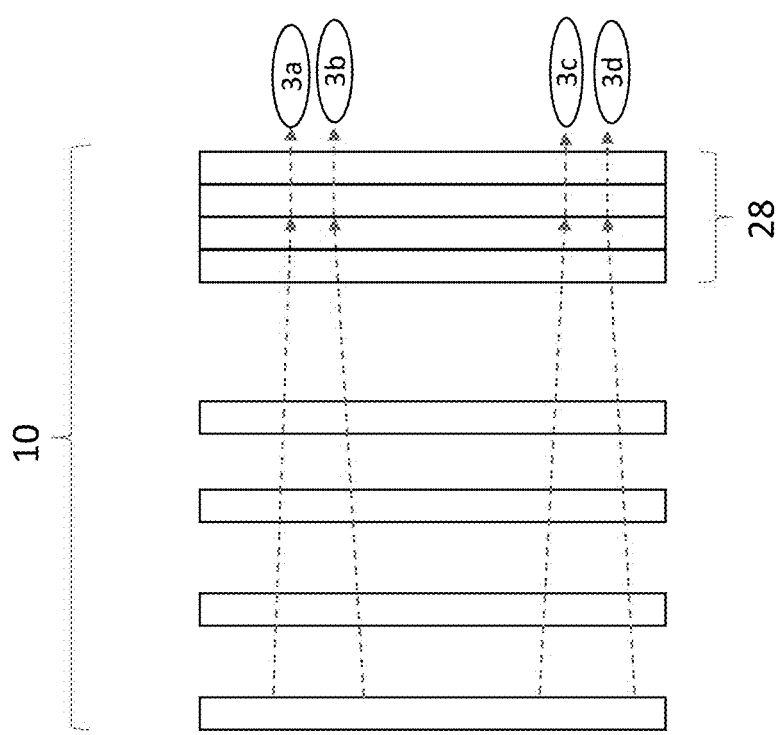
FIG. 4 illustrates exemplary light travel through the optical stack of FIG. 3.

As illustrated in FIG. 4, in this way light (e.g., illustrated rays 3a-3d) which is typically somewhat scattered when exiting the electronic display layer 22 (e.g., at an accepted off-angle) may be at least relatively focused. Other portions of the light may proceed the same or similarly as described with regard to FIG. 2 (e.g., reflecting or accepted by first polarizer 18). This may result in improved image quality, among other advantages.

Figure 6:
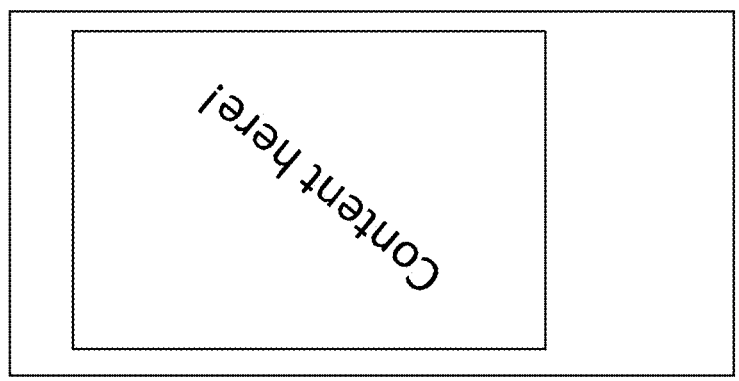
FIG. 6 is a front view of the electronic display assembly of FIG. 5.
Figure 5:
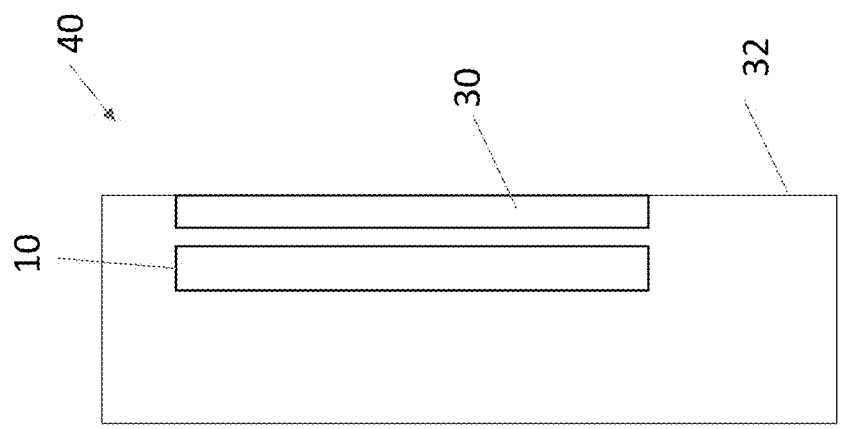
FIG. 5 is a side sectional view of an exemplary electronic display assembly with the optical stack of any of FIGS. 1-4.

FIG. 5 and FIG. 6 illustrates the optical stack 10 in an exemplary electronic display assembly 40. The electronic display assembly 40 may include the optical stack 10 rearward of one or more cover layers 30. The cover layer(s) 30 may be considered part of, or separate from, the optical stack 10. The optical stack 10 may be directly connected (e.g., bonded) to the cover layer(s) 30, or may be spaced apart therefrom, such as to accommodate airflow and/or provide particular lighting/reflectance arrangements. A housing 32 may further enclose the optical stack 10. One or more thermal management devices (e.g., airflow pathways, fans, heaters, air conditioners, filters, heat exchangers, combinations thereof, or the like), network connectivity components, cameras, sensors, way finding equipment, telecommunications equipment, computing equipment, combinations thereof, or the like may be provided at the electronic display assembly 40, such as at least partially within the housing 32. Images displayed at the electronic display layer 22 may be visible through the cover layer(s) 30, such as to a viewer. The electronic display assembly 40 may be configured for indoor, semi-outdoor, and/or outdoor use. Structural framework members or other components may be provided for installing the electronic display assembly 40 at a sidewalk, parking lot, wall, post, item of street furniture, ground surface, combinations thereof, or the like.

The optical stack 10, with or without the cover layer(s) 30, may form an electronic display or display subassembly, such as for the electronic display assembly 40. The size, shape, spacing, orientation, and the like of the optical stack 10, electronic display assembly 40, and/or various components thereof is merely exemplary and not intended to be limiting. Various sizes, shapes, spacings, orientations, and the like of the optical stack 10, electronic display assembly 40, and/or various components thereof may be utilized. For example, the illustrated layers are relatively small so that they may be viewed in their entirety, and the illustrated spacing is relatively exaggerated so that the individual layers may be more clearly distinguished. In practice, the layers may be much closer together and larger in size, by way of non-limiting example.

The electronic display assembly 40 may comprise multiple electronic displays and/or electronic display subassemblies (e.g., optical stacks 10 and/or cover layers 30), which may face in same or different directions, be provided in same or different sizes, shapes, orientations, combinations thereof, or the like. The electronic display(s) or display subassembly(ies) may be movably attached to a structural framework, such as for rotating outward therefrom to service internal components.

The layers of the optical stack 10 and/or cover layer 30 may extend substantially parallel to one another (e.g., within commercially reasonable manufacturing tolerances, within +/−20 degrees, and/or within 5 degrees, without limitation). The layers of the optical stack 10 and/or cover layer 30 may, alternatively or additionally, be substantially coextensive in size (e.g., within commercially reasonable manufacturing tolerances, within 20% relative surface area, and/or within 5%, without limitation).

The optical stack 10 may be manufactured, at least in part, by successively providing the various layers, preferably including optically bonding the MLA 20 to a rear surface of the second polarizer 22, forward surface of the electronic display layer 22, and/or forward surface of the third polarizer 26. The electronic display assembly 40 may be manufactured, at least in part, by providing, mounting, and/or securing the optical stack 10 within a housing 32, such as rearward of a cover layer 30. The electronic display assembly 40 may be operated by displaying images at an electronic display comprising the optical stack 10.

Some or all of the foregoing may be performed by one or more pieces of computerized manufacturing equipment. Inspection may be performed at or between various steps, such as by way of machine vision equipment.

Touch input layers or components may optionally be included in the optical stack 10 or otherwise provided, such as part of the electronic display assembly 40.

Any embodiment of the present invention may include any of the features of the other embodiments of the present invention. The exemplary embodiments herein disclosed are not intended to be exhaustive or to unnecessarily limit the scope of the invention. The exemplary embodiments were chosen and described in order to explain the principles of the present invention so that others skilled in the art may practice the invention. Having shown and described exemplary embodiments of the present invention, those skilled in the art will realize that many variations and modifications may be made to the described invention. Many of those variations and modifications will provide the same result and fall within the spirit of the claimed invention.

Certain operations described herein may be performed by one or more electronic devices. Each electronic device may comprise one or more processors, electronic storage devices, executable software instructions, combinations thereof, and the like configured to perform the operations described herein. The electronic devices may be general purpose computers or specialized computing devices. The electronic devices may comprise personal computers, smartphones, tablets, databases, servers, or the like. The electronic connections and transmissions described herein may be accomplished by wired or wireless means. The computerized hardware, software, components, systems, steps, methods, and/or processes described herein may serve to improve the speed of the computerized hardware, software, systems, steps, methods, and/or processes described herein. The electronic devices, including but not necessarily limited to the electronic storage devices, databases, controllers, or the like, may comprise and/or be configured to hold, solely non-transitory signals.

What is claimed is:

1. An optical stack comprising:
   a first polarizer;
   a micro lens array ("MLA") bonded to a rear surface of the first polarizer;
   a liquid crystal layer ("LC layer");
   a second polarizer bonded to a forward surface of the LC layer, wherein the MLA, the LC layer, the first polarizer, and the second polarizer form, at least in part, a sub-stack, where components of the sub-stack, including at least the MLA, the LC layer, the first polarizer, and the second polarizer are directly or indirectly bonded to one another;
   a third polarizer located rearward of, and separate from, the sub-stack; and
   a prism film located rearward of the third polarizer, where the prism film is separate from the sub-stack.

2. The optical stack of claim 1 further comprising:
   a diffuser located rearward of the prism film, where the diffuser is separate from the sub-stack; and
   a backlight located rearward of the diffuser, where the backlight is separate from the sub-stack.

3. The optical stack of claim 1 wherein:
   the LC layer is bonded to a forward surface of the first polarizer;
   the second polarizer is bonded to a forward surface of the LC layer; and
   the MLA is bonded to a forward surface of the second polarizer.

4. The optical stack of claim 3 further comprising:
   a third polarizer located rearward of, and separate from, the sub-stack; and
   a prism film located rearward of the third polarizer, where the prism film is separate from the sub-stack.

5. The optical stack of claim 4 further comprising:
   a diffuser located rearward of the prism film, where the diffuser is separate from the sub-stack; and
   a backlight located rearward of the diffuser, where the backlight is separate from the sub-stack.

6. The optical stack of claim 1 wherein:
   components of the sub-stack are bonded to one another by way of an optically clear adhesive.

7. An electronic display assembly comprising:
the optical stack of claim 1.

8. The electronic display assembly of claim 7 wherein:
the optical stack further comprises:
a diffuser located rearward of the prism film; and
a backlight located rearward of the diffuser; and
the third polarizer, the prism film, the diffuser, and the backlight are separate from the sub-stack.

9. The electronic display assembly of claim 7 herein:
the LC layer is bonded to a forward surface of the first polarizer;
the MLA is bonded to a forward surface of the second polarizer;
the optical stack further comprises:
a third polarizer located rearward of the sub-stack;
a prism film located rearward of the third polarizer;
a diffuser located rearward of the prism film; and
a backlight located rearward of the diffuser; and
the third polarizer, the prism film, the diffuser, and the backlight are separate from the sub-stack.

10. The electronic display assembly of claim 7 wherein:
components of the sub-stack are bonded to one another by way of an optically clear adhesive.

11. The electronic display assembly of claim 7 further comprising:
a housing; and
a cover, wherein the cover forms a forward portion of the housing and the optical stack is located interior to said housing.

12. The electronic display assembly of claim 11 wherein:
the optical stack is spaced apart from the cover; and
the cover is separate from the sub-stack.

13. The electronic display assembly of claim 11 wherein:
the optical stack is bonded to the cover and forms part of the sub-stack.

14. The electronic display assembly of claim 11 wherein:
the cover comprises multiple, bonded layers of a transparent or translucent material.

15. A method of manufacturing an electronic display assembly, said method comprising:
manufacturing an optical stack comprising:
manufacturing a sub-stack comprising:
bonding a liquid crystal layer ("LC layer") to a forward surface of a first polarizer;
bonding a second polarizer to a forward surface of the LC layer; and
bonding a micro lens array ("MLA") to a forward surface of the second polarizer;
locating a third polarizer rearward of, and separate from, the sub-stack;
locating a prism film located rearward of the third polarizer, where the prism film is separate from the sub-stack;
locating a diffuser rearward of the prism film, where the diffuser is separate from the sub-stack; and
locating a backlight rearward of the diffuser, where the backlight is separate from the sub-stack; and
securing the optical stack within a housing, said housing comprising a cover forming a forward portion of said housing.

16. The method of claim 15 wherein:
components of the sub-stack are bonded to one another by way of an optically clear adhesive; and
the optical stack is spaced apart from the cover such that the cover is separate from the sub-stack.

17. An optical stack comprising:
a sub-stack comprising:
a first polarizer;
a liquid crystal layer ("LC layer") bonded to a forward surface of the first polarizer;
a second polarizer bonded to a forward surface of the LC layer; and
a micro lens array ("MLA") bonded to a forward surface of the second polarizer;
wherein components of the sub-stack, including at least the first polarizer, the LC layer, the second polarizer, and the MLA, are directly or indirectly bonded to one another; and
a third polarizer located rearward of, and separate from, the sub-stack; and
a prism film located rearward of the third polarizer, where the prism film is separate from the sub-stack.

* * * * *

UNITED STATES PATENT AND TRADEMARK OFFICE
CERTIFICATE OF CORRECTION

PATENT NO. : 12,429,726 B1  
APPLICATION NO. : 18/897847  
DATED : September 30, 2025  
INVENTOR(S) : William Dunn Page 1 of 1

It is certified that error appears in the above-identified patent and that said Letters Patent is hereby corrected as shown below:

In the Claims

In Column 7, Line 9, Claim 9, please delete "herein" and insert -- wherein --.

Signed and Sealed this
Eleventh Day of November, 2025

John A. Squires
*Director of the United States Patent and Trademark Office*